US010068407B2

(12) United States Patent
Jones et al.

(10) Patent No.: US 10,068,407 B2
(45) Date of Patent: Sep. 4, 2018

(54) CART INVENTORY SYSTEM AND ASSOCIATED METHODS

(71) Applicant: Wal-Mart Stores, Inc., Bentonville, AR (US)

(72) Inventors: Matthew Allen Jones, Bentonville, AR (US); Aaron James Vasgaard, Fayetteville, AR (US); Nicholaus Adam Jones, Fayetteville, AR (US); Robert James Taylor, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/621,645

(22) Filed: Jun. 13, 2017

(65) Prior Publication Data

US 2018/0061168 A1 Mar. 1, 2018

Related U.S. Application Data

(60) Provisional application No. 62/378,755, filed on Aug. 24, 2016.

(51) Int. Cl.
*G08B 23/00* (2006.01)
*G07F 9/02* (2006.01)
(Continued)

(52) U.S. Cl.
CPC ............ *G07F 9/026* (2013.01); *G05D 1/0234* (2013.01); *G07G 1/0045* (2013.01); *B62B 1/045* (2013.01)

(58) Field of Classification Search
None
See application file for complete search history.

(56) References Cited

U.S. PATENT DOCUMENTS 3,971,568 A * 7/1976 Wright .................... B62B 3/184
280/33.996
5,806,861 A 9/1998 Lipschitz et al.
(Continued)

FOREIGN PATENT DOCUMENTS

CN 204102165 U 1/2015

OTHER PUBLICATIONS

Zimmerman, Tracking Shopping Carts Using Mobile Cameras Viewing Ceiling-Mounted Retro-Reflective Bar Codes, IBM Almaden Research Center, Proceedings of the Fourth IEEE International Conference on Computer Vision Systems, Jul. 2006.

(Continued)

*Primary Examiner* — Brian Zimmerman
(74) *Attorney, Agent, or Firm* — McCarter & English, LLP; David R. Burns

(57) ABSTRACT

An example cart inventory system and associated methods are described. The example cart inventory system includes a cart and a detection system. The cart includes a frame, and a shelf movably mounted to the frame and configured to be positioned between an extended position and a folded position. A top surface and a rear surface of the shelf include first and second identifiers, respectively. The detection system is configured to detect the first identifier when the shelf is in the extended position and detect the second identifier when the shelf is positioned in the folded position. In the extended position, the top surface is oriented upwards relative to horizontal and the rear surface is disposed against the frame. In the folded position, the rear surface is oriented upwards relative to horizontal.

13 Claims, 7 Drawing Sheets

(51) Int. Cl.
  *G05D 1/02* (2006.01)
  *G07G 1/00* (2006.01)
  *B62B 1/04* (2006.01)

(56) References Cited

U.S. PATENT DOCUMENTS

| | | |
|---|---|---|
| 7,089,695 B2 | 8/2006 | Fast et al. |
| 7,308,770 B2 | 12/2007 | Fast et al. |
| 7,347,361 B2 | 3/2008 | Lovett |
| 7,443,295 B2 | 10/2008 | Brice et al. |
| 7,543,741 B2 | 6/2009 | Lovett |
| 7,681,796 B2 | 3/2010 | Cato et al. |
| 7,810,720 B2 | 10/2010 | Lovett |
| 7,920,062 B1 | 4/2011 | Konstad et al. |
| 2002/0121547 A1 | 9/2002 | Wieth et al. |
| 2005/0212234 A1 | 9/2005 | McFarland |
| 2006/0221581 A1 | 10/2006 | DeNies et al. |
| 2006/0289637 A1 | 12/2006 | Brice et al. |
| 2007/0181513 A1* | 8/2007 | Ward .................. A01K 5/0291 211/59.2 |
| 2011/0102144 A1* | 5/2011 | Okina .................. G06Q 30/02 340/5.91 |
| 2017/0295953 A1* | 10/2017 | Sakata .................. A47F 3/002 |

OTHER PUBLICATIONS

Shields Design: Pop-Up Shopping Cart Display, http://shieldsdesign.blogspot.in/2010_12_01_archive.html, Dec. 15, 2010.

International Search Report and Written Opinion from related PCT application No. PCT/US2017/037137 dated Aug. 2, 2017.

\* cited by examiner

CART INVENTORY SYSTEM AND ASSOCIATED METHODS

CROSS-REFERENCE TO RELATED APPLICATIONS

This application claims the benefit of commonly assigned U.S. Provisional Patent Application No. 62/378,755, which was filed on Aug. 24, 2016. The entire content of the foregoing provisional patent application is incorporated herein by reference.

BACKGROUND

A variety of carts can be used to transport objects from one location to another location. It can be difficult to track the location of carts within an environment, often resulting in misplaced, abandoned, or lost carts. It can also be difficult to determine whether a restocking task has been completed with a cart or whether the cart is still in use.

SUMMARY

Exemplary embodiments of the present disclosure provide a cart inventory system that provides a real-time (or substantially real-time) determination on whether carts within the retail environment are in use or not. In particular, the exemplary cart inventory system utilizes video analytics and identifiers on the carts to determine locations of carts and whether the carts are in use. In exemplary embodiments, each cart can include a shelf configured to be positioned between an extended position and a folded position, with each position providing visibility to a respective identifier on the cart. By detecting one of the two identifiers on the cart, a detection system determines a location of the cart and whether the cart is in use or not.

In accordance with embodiments of the present disclosure, an exemplary cart inventory system is provided that generally includes a cart and a detection system. The cart includes a frame and a shelf. The shelf can be movably mounted to the frame and configured to be positioned between an extended position and a folded position. The shelf includes a top surface, first and second side surfaces, and front and rear surfaces. The top surface includes a first identifier and the rear or front surface can include a second identifier. The detection system can be configured to detect the first identifier when the shelf is positioned in the extended position and detect the second identifier when the shelf is positioned in the folded position. In the extended position, the top surface can be oriented upwards (or substantially upwards) relative to horizontal and the rear surface is disposed against the frame. In the folded position, the rear surface can be oriented upwards (or substantially upwards) relative to horizontal (e.g., a downwardly folded position) or the front surface can be oriented upwards (or substantially upwards) relative to horizontal (e.g., an upwardly folded position). In some embodiments, the rear surface of the shelf can include the second identifier and the front surface can include a third identifier, and the shelf can be positioned in either the downwardly folded position or the upwardly folded position such that the rear surface or the front surface can be oriented upwards (or substantially upwards) relative to horizontal.

The detection system can include one or more cameras mounted to a ceiling located over an area within which the cart is disposed. The shelf can be positioned in the extended position when the cart is in use. In the extended position, the detection system is able to detect the first identifier, and the second identifier is hidden from view of the detection system. Based on the ability to detect the first identifier and the inability to detect the second identifier, the detection system determines that the shelf is in the extended position and the cart is in use.

In the folded position, the detection system is able to detect the second identifier (whether on the rear surface or the front surface of the shelf), and the first identifier is hidden from view of the detection system. Based on the ability to detect the second identifier and the inability to detect the first identifier, the detection system determines that the shelf is in the folded position and the cart is not in use. In some embodiments, the first and second identifiers can be barcodes. In some embodiments, the first identifier can be the same as the second identifier. In some embodiments, the first identifier can be different from the second identifier.

In accordance with embodiments of the present disclosure, an exemplary cart is provided that generally includes a frame and a shelf movably mounted to the frame. The shelf can be configured to be positioned between an extended position and a folded position. The shelf includes a top surface, first and second side surfaces, and front and rear surfaces. The top surface includes a first identifier and the rear surface (and/or the front surface) includes a second identifier. In the extended position, the top surface can be oriented upwards (or substantially upwards) relative to horizontal and the rear surface is disposed against the frame. In a downwardly folded position, the rear surface can be oriented upwards (or substantially upwards) relative to horizontal. In an upwardly folded position, the front surface can be oriented upwards (or substantially upwards) relative to horizontal.

The cart can include two or more wheels mounted to the frame for transporting the cart along a surface. The shelf can be movably mounted to the frame at a hinge. In some embodiments, the first and second identifiers can be barcodes. In some embodiments, the first identifier can be the same as the second identifier. In some embodiments, the first identifier can be different from the second identifier.

In accordance with embodiments of the present disclosure, an exemplary method of managing cart inventory is provided. The method includes providing a cart inventory system as described herein. The method includes detecting the first identifier of the cart with the detection system when the shelf is positioned in the extended position. The method includes detecting the second identifier of the cart with the detection system when the shelf is positioned in the folded position. In the extended position, the top surface of the shelf is oriented upwards (or substantially upwards) relative to horizontal and the rear surface is disposed against the frame. In the folded position, the rear surface or the front surface is oriented upwards (or substantially upwards) relative to horizontal.

Detecting the first identifier of the cart with the detection system can indicate that the shelf is in the extended position and the cart is in use. Detecting the second identifier of the cart with the detection system can indicate that the shelf is in the folded position and the cart is not in use. In the extended position, the detection system is able to detect the first identifier, and the second identifier is hidden from view.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the disclosed cart inventory system and associated methods, reference is made to the accompanying figures, wherein.

DETAILED DESCRIPTION

It should be understood that the relative terminology used herein, such as "front", "rear", "left", "top", "bottom", "vertical", "horizontal", "up" and "down" is solely for the purposes of clarity and designation and is not intended to limit the invention to embodiments having a particular position and/or orientation. Accordingly, such relative terminology should not be construed to limit the scope of the present invention. In addition, it should be understood that the invention is not limited to embodiments having specific dimensions. Thus, any dimensions provided herein are merely for an exemplary purpose and are not intended to limit the invention to embodiments having particular dimensions.

Exemplary embodiments of the present disclosure provide a cart inventory system that detects a location of a cart and whether the cart is in use or not. In particular, the exemplary cart inventory system utilizes video analytics and identifiers on the cart to determine whether the cart is in use. Each cart includes a shelf configured to be positioned between an extended position and a folded position, with each position providing visibility to a respective identifier on the cart. By detecting one of the two identifiers on the cart, a detection system determines whether the cart is in use or not.

Figure 1:
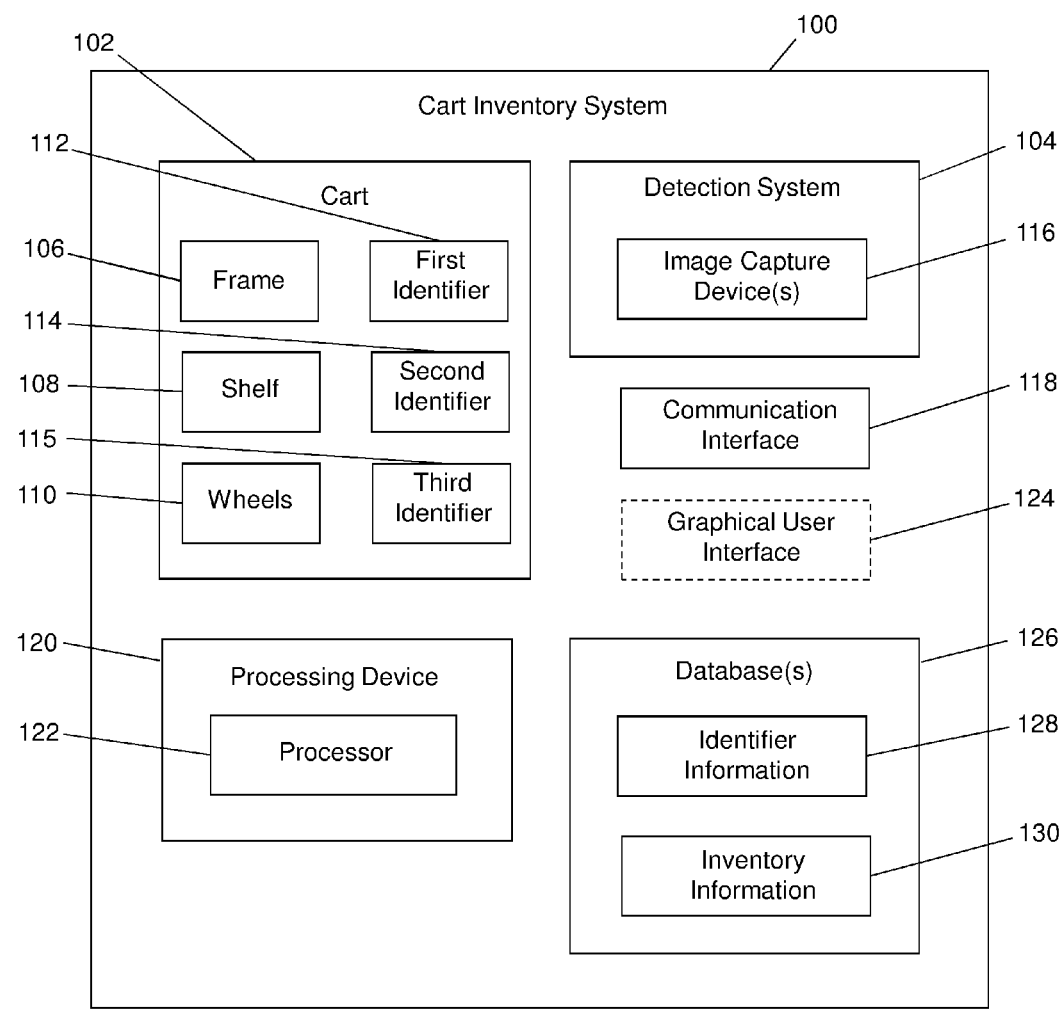
FIG. 1 is a block diagram of an exemplary cart inventory system of the present disclosure.

FIG. 1 is a block diagram of an exemplary cart inventory system 100 (hereinafter "system 100") of the present disclosure. The system 100 generally includes a cart 102 and a detection system 104. The cart 102 includes a frame 106 and a shelf 108 movably mounted to the frame 106. The shelf 108 can be configured to be positioned between an extended position (e.g., an in use position) and a folded position (e.g., a not in use position) by a user. In particular, the shelf 108 can be rotated downwardly into a downwardly folded position so that the rear surface of the shelf 108 is oriented upwardly or rotated upwardly into an upwardly folded position to so that the front surface of the shelf 108 is oriented upwardly. The frame 106 can be mounted on a plurality of wheels 110 for transporting the cart 102 along a surface.

The shelf 108 generally defines a planar surface on which products can be disposed for transport on the cart 102. The shelf 108 can include a planar top surface configured to receive and support products thereon, first and second side surfaces, and front and rear surfaces. The top surface defines a large surface area for supporting one or more products, while the first and second side surfaces and the front and rear surfaces define edges of the planar top surface. The top surface of the shelf 108 includes a first identifier 112 (e.g., a barcode, an alphanumeric identifier, a color patch or label, combinations thereof, or the like) thereon, and the rear surface (and/or the front surface) of the shelf 108 includes a second identifier 114 (e.g., a barcode, an alphanumeric identifier, a color patch or label, combinations thereof, or the like) thereon.

In some embodiments, the first and second identifiers 112, 114 can cover the entire (or substantially the entire) surface of the top and rear surfaces, respectively. In some embodiments, the first and second identifiers 112, 114 can cover only a portion (e.g., 50% or less) of the top and rear surfaces, respectively. In some embodiments, the first and second identifiers 112, 114 can be the same. In some embodiments, the first and second identifiers 112, 114 can be different. In some embodiments, the first and second identifiers 112, 114 can be unique to each cart 102 within the retail environment such that a determination can be made as to whether each cart 102 is being used and the exact location of the cart 102 in the retail environment. In some embodiments, the rear surface includes the second identifier 114 and the front surface includes a third identifier 115 that is different from the second identifier 114.

In embodiments where the first and second identifiers 112, 114 are different, the first identifier 112 can be the same for each cart 102 within the retail environment and the second identifier 114 can be the same for each cart 102 within the retail environment. Thus, a determination can be made as to whether each cart 102 is being used without differentiating between the location of the carts 102. In some embodiments, an alternative locating system can be used to determine the location of each cart 102 within the retail environment.

The detection system 104 includes one or more image capture devices 116 (e.g., cameras, optical readers, combinations thereof, or the like) disposed around the retail environment. The image capture devices 116 can be configured to detect the first identifier 112 of the cart 102 when the shelf 108 is positioned in the extended position, and detect the second identifier 114 when the shelf 108 is positioned in the folded position. For example, one of the image capture devices 116 can be disposed at or near the ceiling of the retail environment, and can scan an area below the image capture device 116 for first and second identifiers 112, 114 of carts 102. The geographic field of view of the image capture device 116 can be limited to a portion of a total area within which the cart 102 can be disposed such that the cart 102 may be within or outside of the field of view of the image capture device 116 depending a location of the cart 102 within the total area.

When the shelf 108 is positioned in the extended position, the top surface having the first identifier 112 can be oriented upwards (or substantially upwards) relative to horizontal (e.g., visible and capable of being captured by one or more of the image capture devices 116), and the rear surface having the second identifier 114 can be disposed against or adjacent to the frame 106, thereby hiding the second identifier 114 from the image capture devices 116 (e.g., incapable of being captured by one of more of the image capturing devices 116). Similarly, in the extended position, the front surface of the shelf 108 having the second identifier 114 extends perpendicularly (or substantially perpendicularly) relative to horizontal, thereby being hidden from the field of view of the image capture devices 116. Therefore, with the shelf 108 in the extended position, the image capture device 116 is capable of detecting only the first identifier 112 of the cart 102 and not the second identifier 114. Based on detection of the first identifier 112, the detection system 104 determines that the cart 102 is in use and that one of the carts 102 is located in a specific area of the environment. In embodiments where the first identifier 112 is unique to each cart 102, the detection system 104 can further determine the specific location of the cart 102 itself within the environment as distinguished from other carts 102 in the environment.

When the shelf 108 is positioned in the folded position, the top surface having the first identifier 112 is oriented sideways or perpendicular (or substantially perpendicular) relative to horizontal (e.g., in capable of being captured by one or more of the image capture devices 116), and the rear surface (or the front surface) having the second identifier 114 can be oriented upwards (or substantially upwards) relative to horizontal (e.g., visible and capable of being captured by one or more of the image capture devices 116). Based on detection of the second identifier 114, the detection system 104 determines that the cart 102 is in use and that one of the carts 102 is located in a specific area of the environment. In embodiments where the second identifier 114 is unique to each cart 102, the detection system 104 can further determine the specific location of the cart 104 itself within the environment as distinguished from other carts 102 in the environment. In some embodiments, if the cart 102 is determined to not be in use, the system 100 can output an alert to a retail associate requesting that the cart 102 be brought back to a cart corral.

The system 100 can include a communication interface 118 configured to provide communication between the detection system 104 and a processing device 120. The processing device 120 can include a processor 122. The detection system 104 can electronically transmit data detected by the image capture devices 116 to the processing device 120 via the communication interface 118 through wired and/or wireless channels. Based on the input detected data, the processing device 120 can determine the status of each cart 102 within the retail environment (and in some embodiments the location of each cart 102 within the retail environment), and can output information regarding the inventory of the carts 102 to a user via a graphical user interface (GUI) 124.

The system 100 can include one or more databases 126 configured to electronically receive and store data relating to the system 100. For example, the database 126 can include identifier information 128 and inventory information 130. The identifier information 128 can include data corresponding with the first and second identifiers 112, 114 of each cart 102. For example, the identifier information 128 can include the unique first identifiers 112 that (if detected) indicate that the cart 102 is in use, and the unique second identifiers 114 that (if detected) indicate that the cart 102 is not in use. As a further example, the identifier information 128 can include the unique color of the first identifier 112 and the unique color of the second identifier 114. The inventory information 130 can include data corresponding to the carts 102 detected to be in use and not in use, and the location of the carts 102 within the retail environment.

Figure 2:
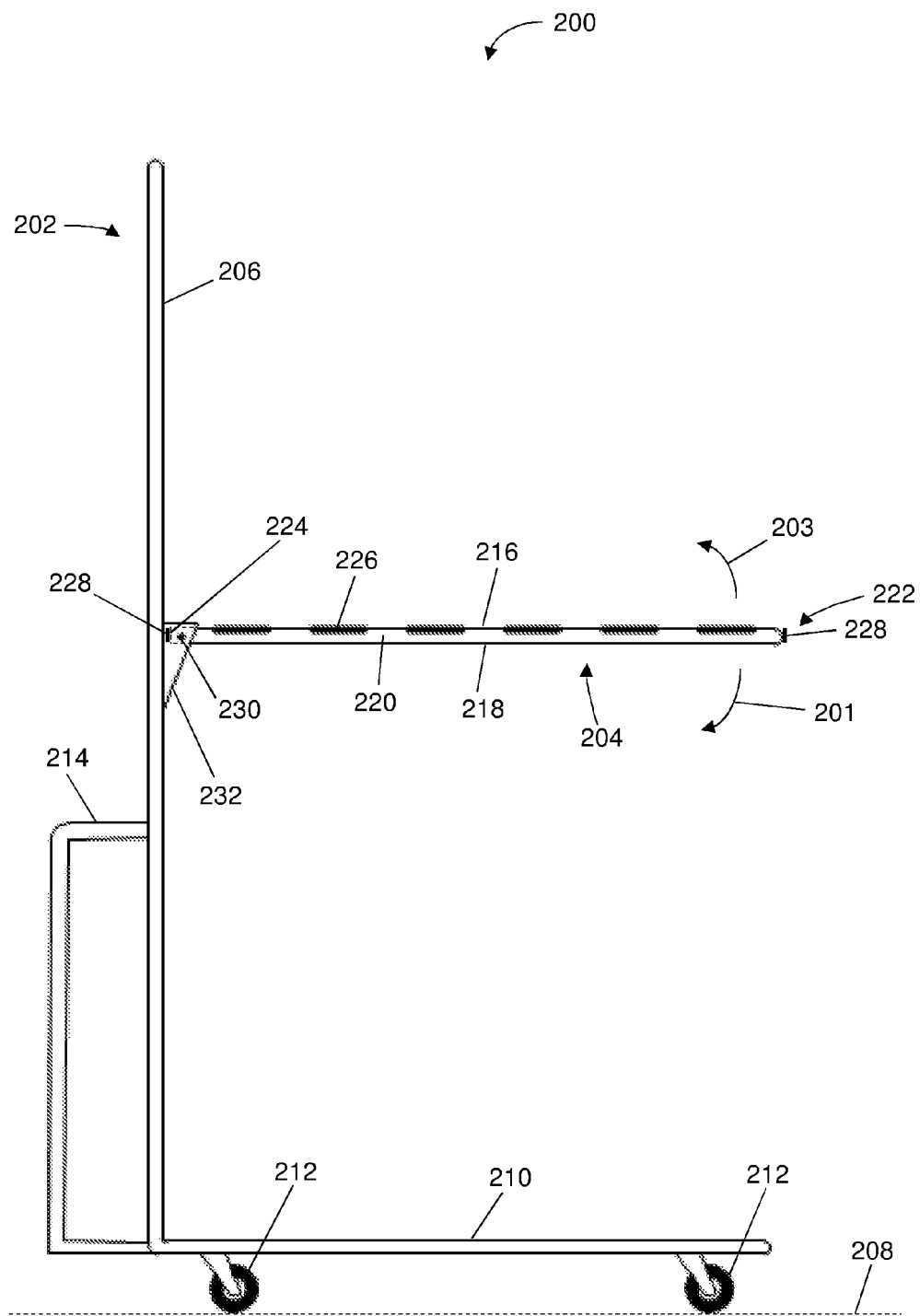
FIG. 2 is a diagram of a cart of an exemplary cart inventory system of the present disclosure including a shelf positioned in an extended position.
Figure 3:
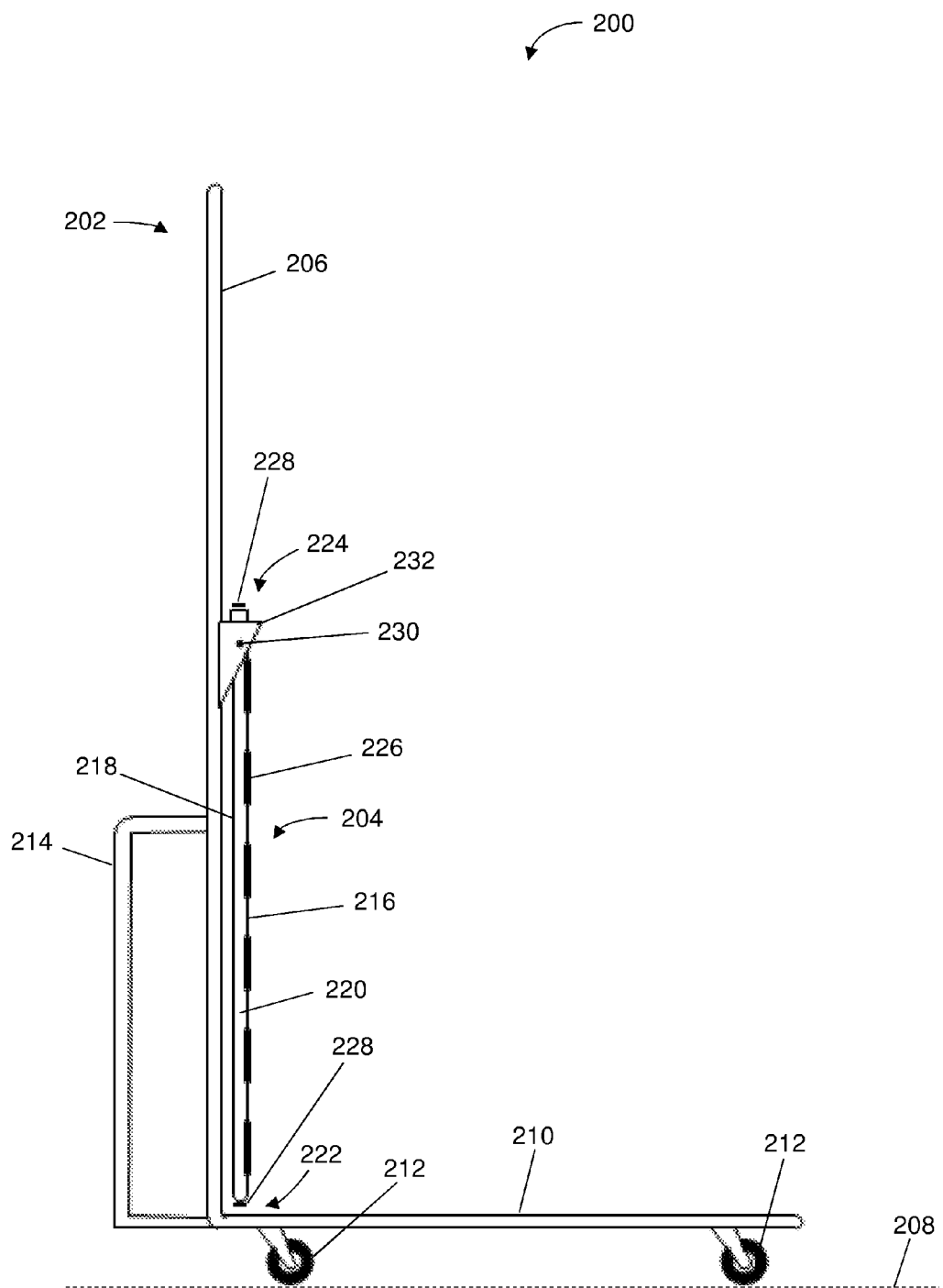
FIG. 3 is a diagram of a cart of an exemplary cart inventory system of the present disclosure including a shelf positioned in a folded position.

With reference to FIGS. 2 and 3, an exemplary cart 200 is provided in an extended position and a folded position, respectively. Although illustrated as a rocket cart, it should be understood that a variety of carts can incorporate components of the disclosed system. Although illustrated as being folded into a downwardly folded position in FIG. 3, it should be understood that the shelf can be rotated in either the downwardly folded position as shown by arrow 201 to expose the rear surface of the shelf to the image capture devices or an upwardly folded position as shown by arrow 203 to expose the front surface of the shelf to the image capture devices. As discussed above, the cart 200 generally includes a frame 202 and a shelf 204 movably mounted to the frame 202. The frame 202 can include a vertical member 206 extending substantially perpendicular to horizontal 208, and a base 210 extending from a distal end of the vertical member 206 substantially parallel to horizontal 208. The base 210 can be mounted on a plurality of wheels 212. In some embodiments, the frame 202 can include a handle section 214 extending from the vertical member 206 on a side opposing the base 210. The handle section 214 can be used to guide the cart 200 along within the retail environment.

The shelf 204 generally includes a top surface 216, a bottom surface 218, first and second side surfaces 220 on opposing sides of the shelf 204, a front surface 222, and a rear surface 224. The top and bottom surfaces 216, 218 can be substantially planar, with the top surface 216 providing a surface area on which one or more products can be supported. The surface area of the top and bottom surfaces 216, 218 is dimensioned greater than the side, front and rear surfaces 220, 222, 224, which defines the edges of the top and bottom surfaces 216, 218.

At least a portion of the top surface 216 includes the first identifier 226 thereon. For example, the first identifier 226 can cover substantially the entire top surface 216. In some embodiments, the first identifier 226 can cover only a portion of the top surface 216. In some embodiments, multiple first identifiers 226 can be disposed on various areas of the top surface 216 in a spaced manner. At least a portion of the rear surface 224 and/or the front surface 222 includes a second identifier 228 thereon. For example, the second identifier 228 can cover substantially the entire rear surface 224 and/or the front surface 222. In some embodiments, the second identifier 228 can cover only a portion of the rear surface 224 and/or the front surface 222. In some embodiments, multiple second identifiers 226 can be disposed on various areas of the rear surface 224 and/or the front surface 222 in a spaced manner.

The shelf 204 can be rotatably mounted to the vertical member 206 at a hinge 230. The hinge 230 defines a rotation axis substantially parallel to horizontal 208. The hinge 230 can be located adjacent to the rear surface 224 of the shelf 204, yet spaced from the rear surface 224 such that the shelf 204 can rotate between supports 232 extending from the vertical member 206. The hinge 230 connection can be disposed at approximately a midpoint of the height of the vertical member 206. However, it should be understood that the hinge 230 connection can be disposed at any location along the vertical member 206 that would allow the shelf 204 to rotate between an extended and folded position.

FIG. 2 shows the shelf 204 disposed in an extended position (e.g., an in use position). In the extended position, the top surface 216 of the shelf is oriented substantially upwards relative to horizontal 208 and in the direction of the image capture device mounted on the ceiling. Thus, the first identifier 226 is also oriented upwards relative to horizontal 208 for detection by the image capture device. In the extended position, due to the rotation of the shelf 204, the rear surface 224 is disposed adjacent to or against the vertical member 206 of the frame 202. Similarly, the front surface 222 (which can optionally include the second identifier 228) is oriented substantially perpendicular to horizontal. Thus, the second identifier 228 is not visible to the image capture device, preventing the second identifier 228 from being detected. Upon scanning the retail environment, the image capture device would detect the first identifier 216, indicating that the cart 200 is in use.

FIG. 3 shows the shelf 204 disposed in a folded position (e.g., a not in use position). In the folded position, the shelf 204 is rotated along the hinge 230 such that the top surface 216 is oriented substantially perpendicular to horizontal 208. The folded position is generally used when the cart 200 is no longer is use, and the shelf 204 is folded downwardly to allow for nesting of multiple carts 200 together. In this position, the first identifier 226 is not visible to the image capture device, thereby preventing the first identifier 226 from being detected. In contrast, due to rotation of the shelf 204, the rear surface 224 is oriented substantially upwards relative to horizontal 208 and in the direction of the image capture device mounted on the ceiling. Upon scanning the retail environment, the image capture device would detect the second identifier 228, indicating that the cart 200 is not in use. It should be understood that the shelf 204 can similarly be rotated upwardly as shown by arrow 203 to orient the front surface 222 (and the second identifier 228) substantially upwards relative to horizontal 208 and in the direction of the image capture device mounted on the ceiling.

Detection of the first and second identifiers 226, 228 can be used to determine the number of carts available for tasks by retail associates and/or whether an assigned task has been completed. For example, if a retail associate is assigned to a particular department for stocking products on a shelf, detection of the first identifier 226 on the cart 200 in the designated department can indicate that the retail associate is using the cart 200 and the task has not been completed. As a further example, detection of the second identifier 228 on the cart 200 in the designated department can indicate that the retail associate is not using the cart 200 and the task has been completed. Thus, the system 100 can be used to determine the status of assigned tasks with the retail environment.

Figure 4:
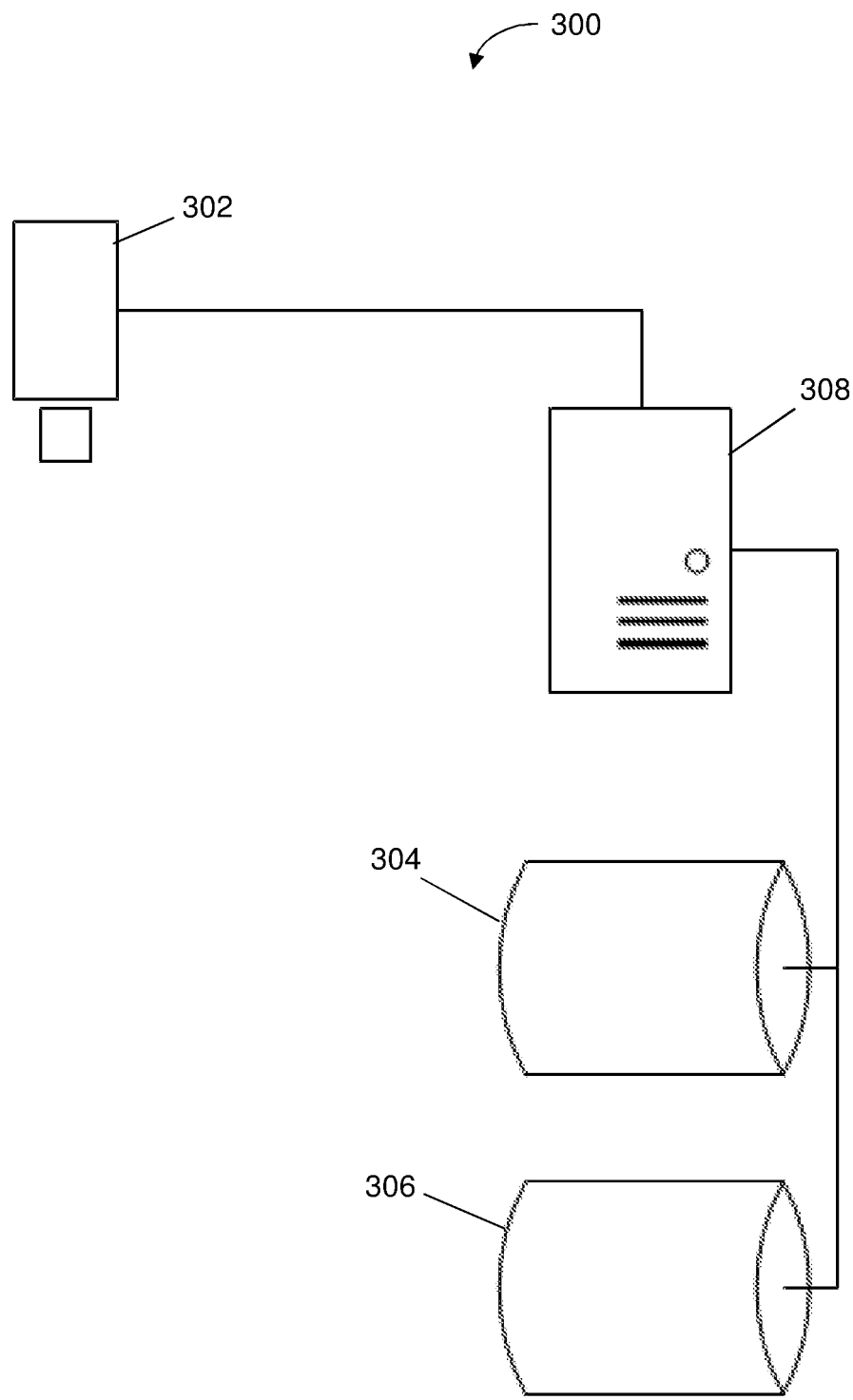
FIG. 4 is a block diagram of a detection system of the present disclosure.

FIG. 4 is a block diagram of an exemplary detection system 300. The detection system 300 includes one or more image capture devices 302 communicatively linked with databases 304, 306 through a server 308. The image capture devices 302 can be communicatively linked with the databases 304, 306 through wired and/or wireless means. In some embodiments, the image capture devices 302 are mounted at or near the ceiling and are oriented downward to detect identifiers of the carts below or around the image capture devices 302. In some embodiments, the image capture devices 302 are configured to scan an area around the image capture devices 302 to detect identifiers of the carts in the area. The database 304 can electronically store data corresponding to identifiers associated with the carts 200. The database 306 can electronically store data corresponding to inventory of carts 200 in the retail environment.

Figure 5:
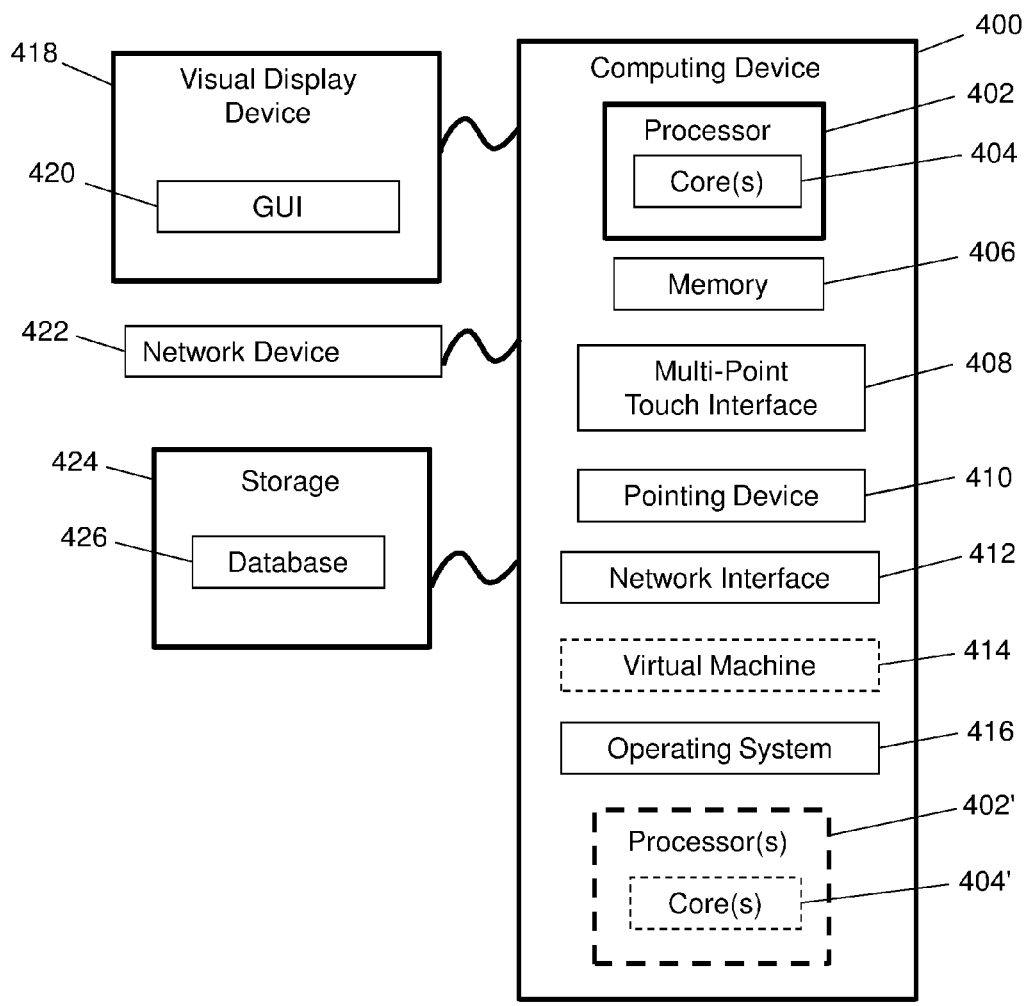
FIG. 5 is a block diagram of a computing device in accordance with exemplary embodiments of the present disclosure.

FIG. 5 is a block diagram of a computing device 400 in accordance with exemplary embodiments of the present disclosure. The computing device 400 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 406 included in the computing device 400 may store computer-readable and computer-executable instructions or software for implementing exemplary embodiments of the present disclosure (e.g., instructions for controlling one or more portions of the detection system 104, or the like). The computing device 400 also includes configurable and/or programmable processor 402 and associated core 404, and optionally, one or more additional configurable and/or programmable processor(s) 402' and associated core(s) 404' (for example, in the case of computer systems having multiple processors/cores), for executing computer-readable and computer-executable instructions or software stored in the memory 406 and other programs for controlling system hardware. Processor 402 and processor(s) 402' may each be a single core processor or multiple core (404 and 404') processor.

Virtualization may be employed in the computing device 400 so that infrastructure and resources in the computing device 400 may be shared dynamically. A virtual machine 414 may be provided to handle a process running on multiple processors so that the process appears to be using only one computing resource rather than multiple computing resources. Multiple virtual machines may also be used with one processor.

Memory 406 may include a computer system memory or random access memory, such as DRAM, SRAM, EDO RAM, and the like. Memory 406 may include other types of memory as well, or combinations thereof.

A user may interact with the computing device 400 through a visual display device 418 (e.g., a personal computer, a mobile smart device, or the like), such as a computer monitor, which may display one or more user interfaces 420 (e.g., GUI 124) that may be provided in accordance with exemplary embodiments. The computing device 400 may include other I/O devices for receiving input from a user, for example, a keyboard or any suitable multi-point touch interface 408, a pointing device 410 (e.g., a mouse). The keyboard 408 and the pointing device 410 may be coupled to the visual display device 418. The computing device 400 may include other suitable conventional I/O peripherals.

The computing device 400 may also include one or more storage devices 424, such as a hard-drive, CD-ROM, or other computer readable media, for storing data and computer-readable instructions and/or software that implement exemplary embodiments of the system 100 described herein. Exemplary storage device 424 may also store one or more databases 426 for storing any suitable information required to implement exemplary embodiments. For example, exemplary storage device 424 can store one or more databases 426 for storing information, such as data relating to identifier information 128, inventory information 130, combinations thereof, or the like, and computer-readable instructions and/or software that implement exemplary embodiments described herein. The databases 426 may be updated by manually or automatically at any suitable time to add, delete, and/or update one or more items in the databases.

The computing device 400 can include a network interface 412 configured to interface via one or more network devices 422 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 412 may include a built-in network adapter, network interface card, PCMCIA network card, card bus network adapter, wireless network adapter, USB network adapter, modem or any other device suitable for interfacing the computing device 400 to any type of network capable of communication and performing the operations described herein. Moreover, the computing device 400 may be any computer system, such as a workstation, desktop computer, server, laptop, handheld computer, tablet computer (e.g., the iPad™ tablet computer), mobile computing or communication device (e.g., the iPhone™ communication device), or other form of computing or telecommunications device that is capable of communication and that has sufficient processor power and memory capacity to perform the operations described herein.

The computing device 400 may run any operating system 416, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 416 may be run in native mode or emulated mode. In an exemplary embodiment, the operating system 416 may be run on one or more cloud machine instances.

Figure 6:
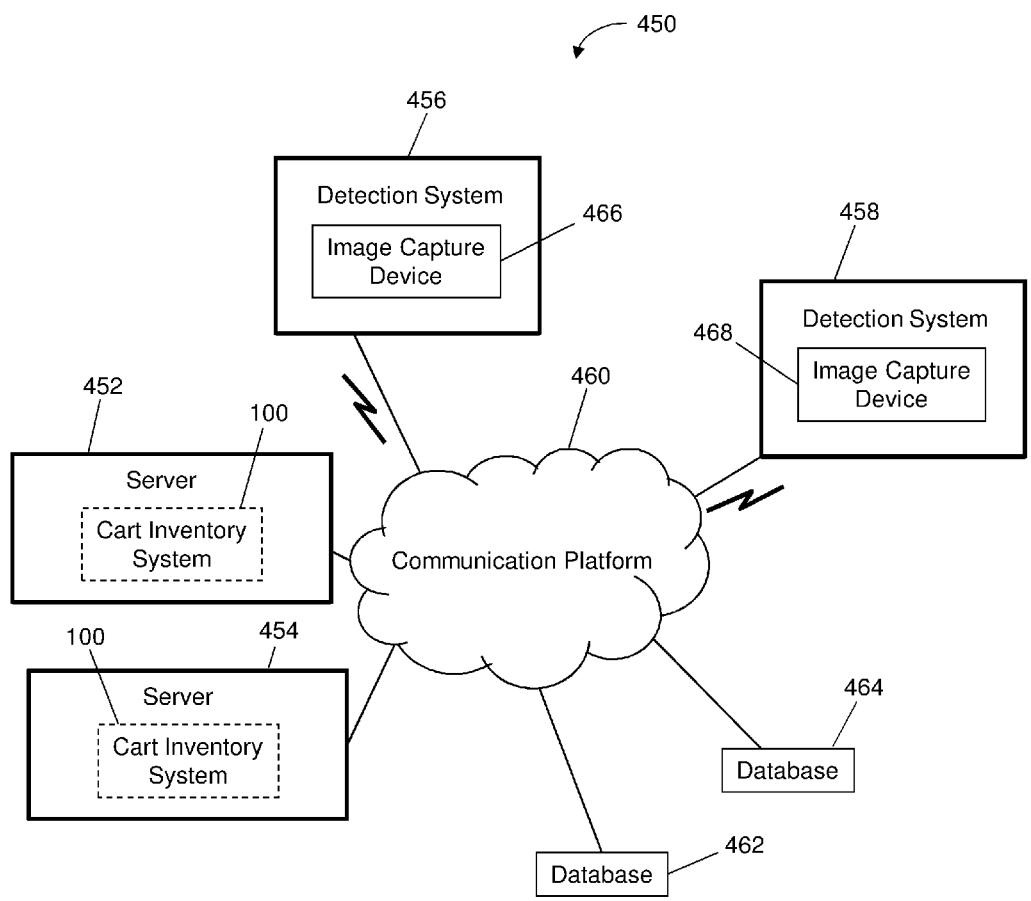
FIG. 6 is a block diagram of an exemplary cart inventory system environment in accordance with embodiments of the present disclosure.

FIG. 6 is a block diagram of an exemplary cart inventory system environment 450 in accordance with exemplary embodiments of the present disclosure. The environment 450 can include servers 452, 454 operatively coupled to one or more detection systems 356, 358, via a communication platform 460, which can be any network over which information can be transmitted between devices communicatively coupled to the network. For example, the communication platform 460 can be the Internet, Intranet, virtual private network (VPN), wide area network (WAN), local area network (LAN), and the like. In some embodiments, the communication platform 460 can be part of a cloud environment. The environment 450 can include repositories or databases 462, 464, which can be operatively coupled to the servers 452, 454, as well as to the detection systems 456, 458, via the communications platform 460. In exemplary embodiments, the servers 452, 454, detection systems 456, 458, and databases 462, 464 can be implemented as computing devices (e.g., computing device 400). Those skilled in the art will recognize that the databases 462, 464 can be incorporated into one or more of the servers 452, 454 such that one or more of the servers 452, 454 can include databases 462, 464. In some embodiments, the database 462 can store the identifier information 128, and the database 464 can store the inventory information 130. In some embodiments, a single database 462, 464 can store both the identifier information 128 and the inventory information 130.

In some embodiments, embodiments of the servers 452, 454 can be configured to implement one or more portions of the system 100. For example, server 452 can be configured to implement one or more portions of one detection system 456 including an image capture device 466, and server 454 can be configured to implement one or more portions of another detection system 456 including an image capture device 468.

Figure 7:
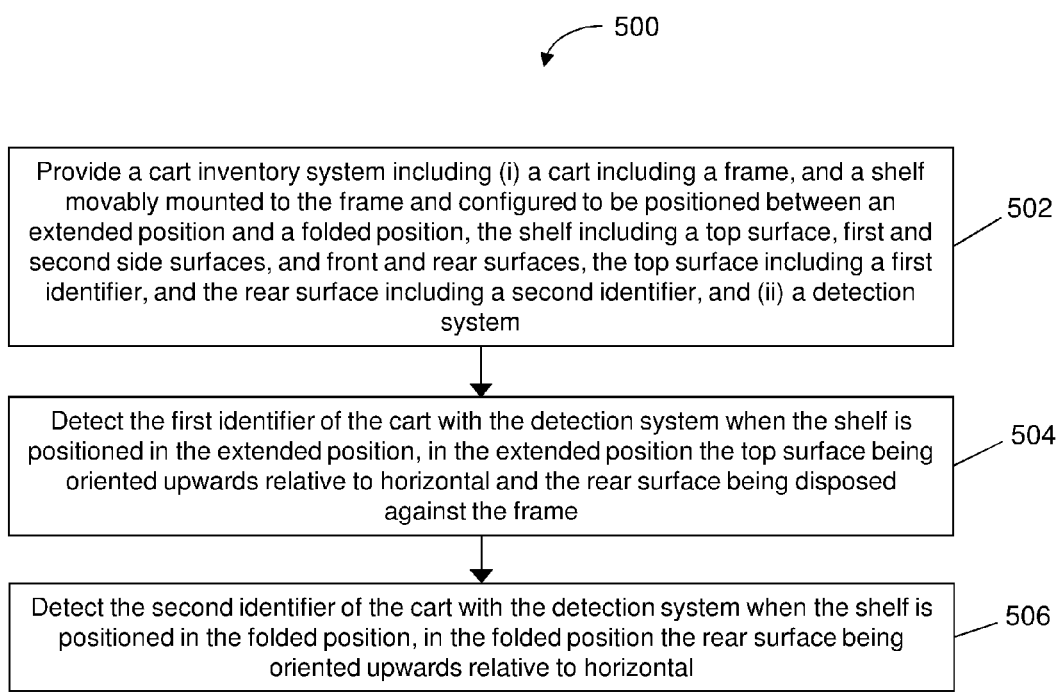
FIG. 7 is a flowchart illustrating an implementation of an exemplary cart inventory system in accordance with embodiments of the present disclosure.

FIG. 7 is a flowchart illustrating an exemplary process 500 as implemented by the cart inventory system 100. To begin, at step 502, a cart is provided including a frame, and a shelf movably mounted to the frame and configured to be positioned between an extended position and a folded position. The shelf includes a top surface, first and second side surfaces, and front and rear surfaces. The top surface includes a first identifier, and the rear surface includes a second identifier. The system 100 further includes a detection system.

At step 504, the first identifier of the cart is detected with the detection system when the shelf is positioned in the extended position. In the extended position, the top surface is oriented upwards relative to horizontal and the rear surface is disposed against or adjacent to the frame, thereby hiding the second identifier from detection by the detection system. At step 506, the second identifier of the cart is detected with the detection system when the shelf is positioned in the folded position. In the folded position, the rear surface is oriented upwards relative to horizontal, thereby allowing the second identifier to be detected by the detection system, while maintaining the first identifier hidden from view of the detection system. Thus, the exemplary system 100 allows for detection of carts in the retail environment and determination as to whether the carts are in use or not in substantially real-time. An accurate and up-to-date inventory of the carts can thereby be maintained.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A cart inventory system, comprising:
    a cart including (i) a frame, and (ii) a shelf movably mounted to the frame and configured to be positioned between an extended position and a folded position, the shelf including a top surface, first and second side surfaces, and front and rear surfaces, the top surface including a first identifier, and the rear surface including a second identifier, the first and second identifier being barcodes; and
    a detection system configured to detect the first identifier when the shelf is positioned in the extended position and detect the second identifier when the shelf is positioned in the folded position,
    wherein in the extended position, the top surface is oriented upwards relative to horizontal and the rear surface is disposed against the frame; and
    wherein in the folded position, the rear surface is oriented upwards relative to horizontal.

2. The cart inventory system of claim 1, wherein the detection system comprises one or more cameras mounted to a ceiling located over the cart.

3. The cart inventory system of claim 1, wherein the shelf is positioned in the extended position when the cart is in use.

4. The cart inventory system of claim 1, wherein in the extended position, the detection system is able to detect the first identifier, and the second identifier is hidden from view of the detection system.

5. The cart inventory system of claim 4, wherein based on the ability to detect the first identifier and the inability to detect the second identifier, the detection system determines that the shelf is in the extended position and the cart is in use.

6. The cart inventory system of claim 1, wherein in the folded position, the detection system is able to detect the second identifier, and the first identifier is hidden from view of the detection system.

7. The cart inventory system of claim 6, wherein based on the ability to detect the second identifier and the inability to detect the first identifier, the detection system determines that the shelf is in the folded position and the cart is not in use.

8. The cart inventory system of claim 1, wherein the first identifier is the same as the second identifier.

9. The cart inventory system of claim 1, wherein the first identifier is different from the second identifier.

10. A method of managing cart inventory, comprising:
providing a cart inventory system, the cart inventory system including (i) a cart including a frame, and a shelf movably mounted to the frame and configured to be positioned between an extended position and a folded position, the shelf including a top surface, first and second side surfaces, and front and rear surfaces, the top surface including a first identifier, and the rear surface including a second identifier, the first and second identifiers being barcodes, and (ii) a detection system;
detecting the first identifier of the cart with the detection system when the shelf is positioned in the extended position; and
detecting the second identifier of the cart with the detection system when the shelf is positioned in the folded position,
wherein in the extended position, the top surface is oriented upwards relative to horizontal and the rear surface is disposed against the frame; and
wherein in the folded position, the rear surface is oriented upwards relative to horizontal.

11. The method of claim 10, wherein detecting the first identifier of the cart with the detection system indicates that the shelf is in the extended position and the cart is in use.

12. The method of claim 10, wherein detecting the second identifier of the cart with the detection system indicates that the shelf is in the folded position and the cart is not in use.

13. The method of claim 10, wherein in the extended position, the detection system is able to detect the first identifier, and the second identifier is hidden from view.

* * * * *